United States Patent
Ard et al.

(10) Patent No.: US 11,576,040 B2
(45) Date of Patent: Feb. 7, 2023

(54) SIMPLIFIED WI-FI AND/OR CLOUD ENROLLMENT FOR WI-FI DEVICES

(71) Applicant: LEVITON MANUFACTURING CO., INC., Melville, NY (US)

(72) Inventors: Aaron Ard, Ponchatoula, LA (US); James Shurte, New Orleans, LA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 242 days.

(21) Appl. No.: 16/705,730

(22) Filed: Dec. 6, 2019

(65) Prior Publication Data
US 2020/0187001 A1 Jun. 11, 2020

Related U.S. Application Data

(60) Provisional application No. 62/777,952, filed on Dec. 11, 2018.

(51) Int. Cl.
H05B 47/19 (2020.01)
H05B 45/31 (2020.01)
(Continued)

(52) U.S. Cl.
CPC ............. *H04W 12/06* (2013.01); *H04L 9/302* (2013.01); *H04W 12/04* (2013.01)

(58) Field of Classification Search
CPC ..... H04W 12/06; H04W 12/04; H04W 12/08; H04L 9/302; H04L 9/0825; H04L 2209/80; H04L 67/12
See application file for complete search history.

(56) References Cited

U.S. PATENT DOCUMENTS

| 10,021,765 | B1 * | 7/2018 | Elliot | H05B 47/115 |
| 2013/0223279 | A1 * | 8/2013 | Tinnakornsrisuphap | |
| | | | | H04W 4/80 |
| | | | | 370/254 |
| 2020/0244297 | A1 * | 7/2020 | Zalewski | H04W 76/10 |

FOREIGN PATENT DOCUMENTS

WO WO-2022187400 A1 * 9/2022 ............. H05B 47/19

OTHER PUBLICATIONS

Tongtong Li; Jian Ren; Xiaochen Tang; "Secure wireless monitoring and control systems for smart grid and smart home"; IEEE Wireless Communications; Year: Jun. 2012 | vol. 19, Issue: 3 | Magazine Article | Publisher: IEEE; pp. 66-73 (Year: 2012).*

* cited by examiner

*Primary Examiner* — Shewaye Gelagay
*Assistant Examiner* — Courtney D Fields
(74) *Attorney, Agent, or Firm* — KDB Firm PLLC

(57) ABSTRACT

A wireless enabled lighting device having the ability to retrieve credentials for a primary wireless LAN from another previously configured wireless enabled lighting device is disclosed. After installation, the lighting device may be instructed to join a secondary wireless network temporarily provided by the previously configured lighting device. Once connected to the secondary wireless network, the lighting device may be provided the credentials for the primary wireless LAN from the previously installed device. The lighting device may then join the primary wireless LAN based on the provided credentials and may automatically initiate enrollment with a remote cloud service. After enrollment, the lighting device may be instructed to operate as an access point for the secondary wireless network, thereby allowing a subsequently installed lighting device to retrieve the credentials for the primary wireless LAN from the newly enrolled lighting device.

14 Claims, 3 Drawing Sheets

(51) Int. Cl.
*H04W 12/06* (2021.01)
*H04L 9/30* (2006.01)
*H04W 12/04* (2021.01)

SIMPLIFIED WI-FI AND/OR CLOUD ENROLLMENT FOR WI-FI DEVICES

CROSS-REFERENCE TO RELATED APPLICATIONS

This application is a non-provisional of and claims the benefit of priority under 35 U.S.C. § 119(e) from U.S. Provisional Application Ser. No. 62/777,952 filed Dec. 11, 2018, entitled "SIMPLIFIED WI-FI AND/OR CLOUD ENROLLMENT FOR WI-FI DEVICES."

FIELD OF THE DISCLOSURE

The present disclosure relates generally to a lighting device and, more particularly, to a wireless enabled lighting device.

BACKGROUND OF THE DISCLOSURE

Conventional wireless enabled lighting devices may transmit and/or receive commands over wireless local area networks (LANs), thereby allowing a user to remotely control each installed wireless enabled lighting device within a particular space. However, to ensure each lighting device may communicate over a wireless LAN, the user is required to individually configure each lighting device with the credentials (e.g., network name and password) for the wireless LAN. Once connected to the wireless LAN, the user is further required to enroll each lighting device with a remote cloud service to enable remote management of each lighting device. For environments with many installed lighting devices, separately providing network credentials to each lighting device and separately enrolling each lighting device with the remote cloud service is time-consuming and tedious.

Thus, it would be desirable to provide a lighting device having the ability to retrieve wireless LAN credentials and/or any other additional configuration or remote cloud enrollment information from a lighting device previously configured with the wireless LAN credentials, thereby obviating the need for the user to individually and independently configure each lighting device one at a time.

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure is directed to a wireless enabled lighting device having the ability to seek out and retrieve wireless network credentials for a primary wireless LAN from another previously configured wireless enabled lighting device. After installation, the lighting device may be instructed to join a secondary wireless network temporarily provided by the previously configured lighting device. Once connected to the secondary wireless network, the lighting device may be provided the wireless network credentials for the primary wireless LAN from the previously installed device. The lighting device may then join the primary wireless LAN based on the provided wireless network credentials and may automatically initiate enrollment with a remote cloud service. After enrollment, the lighting device may be instructed to operate as an access point for the secondary wireless network, thereby allowing a subsequently installed lighting device to retrieve the wireless network credentials for the primary wireless LAN from the newly enrolled lighting device.

In one embodiment, disclosed herein is a lighting device including a memory component and logic, at least a portion of the logic implemented in circuitry coupled to the memory component, the logic to receive an instruction to enter a setup help mode of operation, disconnect from a first wireless network and operate as an access point for a second wireless network, receive a message from an additional lighting device, generate a response message, the response message to include first credentials for the first wireless network, the first credentials stored in the memory component, and transmit the response message to the additional lighting device over the second wireless network.

In one embodiment, disclosed herein is a method including receiving an instruction to enter a setup help mode of operation, disconnecting from a first wireless network, operating as an access point for a second wireless network, receiving a message from a lighting device, generating a response message, the response message to include first credentials for the first wireless network, and transmitting the response message to the lighting device over the second wireless network.

In one embodiment, disclosed herein is a lighting device including a memory component and logic, at least a portion of the logic implemented in circuitry coupled to the memory component, the logic to receive an instruction to obtain first credentials for a first wireless network, retrieve predetermined second credentials for a second wireless network from the memory component, join the second wireless network based on the predetermined second credentials for the second wireless network, generate a message, transmit the message to an additional lighting device operating as an access point for the second wireless network, and receive a response message from the additional lighting device operating as an access point for the second wireless network, the response message to include the first credentials for the first wireless network.

In one embodiment, disclosed herein is a method including receiving an instruction to obtain first credentials for a first wireless network, retrieving predetermined second credentials for a second wireless network, joining the second wireless network based on the predetermined second credentials for the second wireless network, generating a message, transmitting the message to a lighting device operating as an access point for the second wireless network, and receiving a response message from the lighting device operating as an access point for the second wireless network, the response message to include the first credentials for the first wireless network.

BRIEF DESCRIPTION OF THE DRAWINGS

By way of example, specific embodiments of the disclosed device will now be described, with reference to the accompanying drawings, in which.

DETAILED DESCRIPTION

Figure 1:
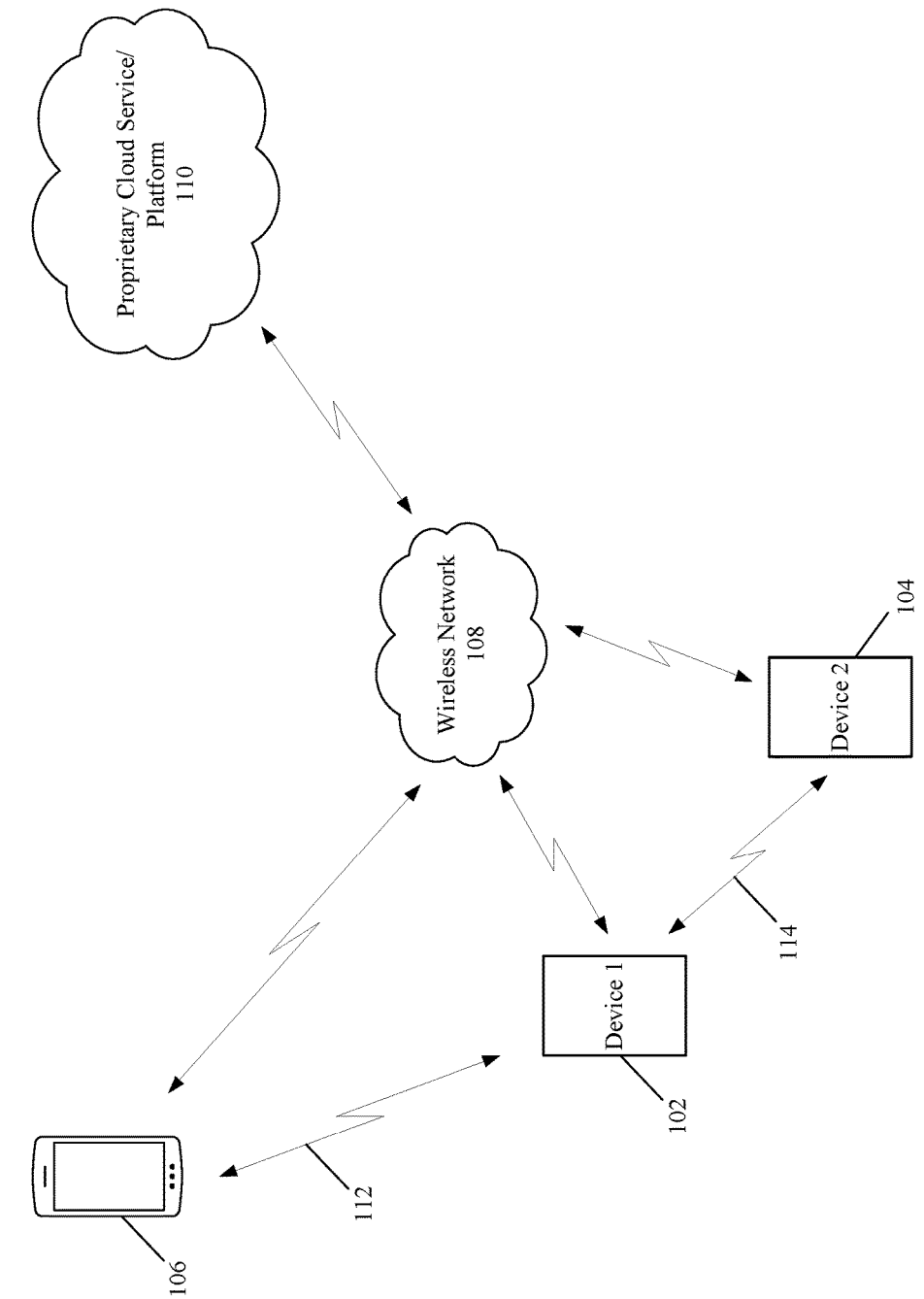
FIG. 1 illustrates an example embodiment of an operating environment for two or more lighting devices according to the present disclosure.

A device, system, and method in accordance with the present disclosure will now be described more fully hereinafter with reference to the accompanying drawings, in which example embodiments of the device, system, and method are shown. The disclosed device, system, and method, however, may be embodied in many different forms and should not be construed as being limited to the embodiments set forth herein. Rather, these embodiments are provided so that this disclosure will be thorough and complete, and will fully convey the scope of the devices, system and method to those skilled in the art. In the drawings, like numbers refer to like elements throughout.

FIG. 1 illustrates an example embodiment of an operating environment 100 for efficiently configuring lighting devices. The operating environment 100 may include a first lighting device 102, a second lighting device 104, and a user device 106. The operating environment 100 may further include a wireless network 108. The first lighting device 102, the second lighting device 104, the user device 106, and the wireless network 108 may be provided within the same physical space such as, for example, a home, an office, a retail space, a warehouse, etc. Alternatively, the first lighting device 102, the second lighting device 104, the user device 106, and the wireless network 108 may be located in separate spaces.

The first and second lighting devices 102 and 104 may be any suitable lighting device now known or hereafter developed that may include or may be coupled to a lighting load. For example, the first and second lighting devices 102 and 104 may be a smart lighting device, a wireless enabled lighting device, a wireless plug-in coupled lighting device, or any other now known or hereafter developed lighting device or system. The first and second lighting devices 102 and 104 may alternatively be any lighting control device that may be used to control one or more lighting devices and/or lighting loads within the operating environment 100. Under either scenario, the first and second lighting device 102 and 104 may be capable of transmitting and receiving communications over a wireless network such as, for example, Wi-Fi, or the like. The first and second lighting devices 102 and 104 may be identical devices or, alternatively, may be different types of devices. The operating environment 100 is not limited to first and second lighting devices 102 and 104, rather any number of lighting devices may be used.

The user device 106 may be an electronic device and/or a computing device such as, for example, a smartphone, a tablet, a laptop, a notebook, a netbook, or a personal computer (PC). In use, the user device 106 may interact with the first and second lighting device 102 and 104 as described further herein.

The wireless network 108 may be any type of wireless local area network (LAN) operating according to any known wireless communication standard or protocol. For example, in one embodiment, the wireless network 108 may be a Wi-Fi wireless LAN operating according to any IEEE 802.11 standard or protocol. In use, the wireless network 108 enables communication between each of the components depicted in the operating environment 100. Accordingly, each component of the operating environment 100 may communicate with any other component of the operating environment 100 through the wireless network 108. In one embodiment, the wireless network 108 may be provided by operation of a router or an access point that may route communications between any components of the operating environment 100.

As further shown in FIG. 1, the wireless network 108 may provide connectivity between any component of the operating environment 100 and a proprietary cloud service and/or platform 110. The proprietary cloud service and/or platform 110 may be any proprietary cloud service and/or platform associated or affiliated with the lighting devices 102 and/or 104 such as, for example, a company's proprietary cloud service (herein referred to as the "Proprietary" cloud or platform 110). The Proprietary cloud 110 may store information relating to the operating environment 100 including, for example, the components within the operating environment 100, information relating to an owner or user of the operating environment 100, information regarding an account affiliated with the operating environment 100, etc. The wireless network 108 may also provide connectivity between any component of the operating environment 100 and any third-party cloud service or platform or the Internet (not depicted in FIG. 1 for simplicity).

As a lighting control device, one or more of the lighting devices 102 and 104 may wirelessly control other lighting devices and/or lighting loads within the operating environment 100 by issuing commands over the wireless network 108. As a lighting device with an included or coupled load, one or more of the lighting devices 102 and 104 may be wirelessly controlled by a lighting control device within the operating environment 100 by receiving commands over the wireless network 108. Under either scenario, to facilitate operation of the lighting devices 102 and 104 within the operating environment 100, the lighting devices 102 and 104 may be configured to connect to the wireless network 108 and to enroll with the Proprietary cloud 110. Techniques described herein enable the lighting devices 102 and 104 to be configured in a more efficient and user-friendly manner.

After a user installs the lighting device 102, the user may interact with the lighting device 102 to connect the lighting device 102 to the wireless network 108 and to enroll the lighting device 102 with the Proprietary cloud 110. Installing the first lighting device 102 may involve coupling the first lighting device 102 to a power connection at a set physical location. In one embodiment, the lighting device 102 may be connected to the wireless network 108 and enrolled with the Proprietary cloud 110 by the user directly interacting with the lighting device 102—for example, by directly manipulating user control features provided by the lighting device 102. In another embodiment, the user may use the user device 106 to connect the lighting device 102 to the wireless network 108 and to enroll the lighting device 102 with the Proprietary cloud 110. The user device 106 may include an application (app) or other program that allows the user to connect the lighting device 102 to the wireless network 108 and to enroll the lighting device 102 with the Proprietary cloud 110.

The user device 106 may communicate with the lighting device 102 by any suitable mechanism now known or hereafter developed. For example, in one embodiment, the user device 106 may communicate directly with the lighting device 102 over a direct wireless communication link 112 to connect the lighting device 102 to the wireless network 108 and to enroll the lighting device 102 with the Proprietary cloud 110. The direct wireless communication link 112 may operate according to any wireless communication standard or protocol including, for example, Bluetooth, Bluetooth Low Energy (BLE), Near-field communication (NFC), or any other short range wireless technology.

Connecting the lighting device 102 to the wireless network 108 may involve providing the lighting device 102 with configuration or other setup information related to the wireless network 108 such that the lighting device 102 may transmit and receive communications over the wireless network 108. The configuration or other setup information may include, for example, an identifier for the wireless network 108, a password, etc. Enrolling the lighting device 102 with the Proprietary cloud 110 may include associating the lighting device 102 to the specific operating environment 100—for example, to the particular office space, room, house, etc. that the components in the operating environment 100 occupy. Further, as part of enrolling the lighting device 102 with the Proprietary cloud 110, the user may specify how the lighting device 102 is to be controlled and by what lighting control devices and/or may specify what other lighting devices the lighting device 102 may control.

After the first lighting device 102 is connected to the wireless network 108 and enrolled with the Proprietary cloud 110, the first lighting device 102 may store the configuration information related to the wireless network 108 provided by the user (e.g., either directly or through the user device 106) that enables a device to connect to the wireless network 108. In one embodiment, the wireless network 108 is a Wi-Fi wireless network and the first lighting device 102 may store the service set identifier (SSID), password, and any other configuration data for the wireless network 108.

The user may then install the second lighting device 104. Installation of the second lighting device 104 may involve coupling the second lighting device 104 to a power connection at a set physical location. The user may then instruct the first lighting device 102 to enter a setup help mode of operation. The user may cause the first lighting device 102 to enter the setup help mode of operation by direct interaction with the first lighting device. Alternatively, the user may cause the first lighting device 102 to enter the setup help mode of operation by using the app or other program provided by the user device 106 and interacting with the first lighting device 102 through the wireless network 108 or through the direct wireless communication link 112.

In response to receiving an instruction from the user to enter into the setup help mode of operation, the first lighting device 102 may disconnect from the wireless network 108. Further, the first lighting device 102 may begin to operate as a wireless access point or hub to provide a secondary or auxiliary wireless network. In one embodiment, the first lighting device 102 may operate as a Wi-Fi access point based on a predetermined SSID and password that is different from the SSID and password for the wireless network 108. By operating as a wireless access point or hub, the first lighting device 102 may provide a wireless communication link 114 for communication with the second lighting device 104 that does not involve communicating over the wireless network 108. The communication link 114 may be based on any wireless communication standard or protocol such as, for example, Wi-Fi as mentioned above. The access point mode of operation of the first lighting device 102 and the associated provided wireless communication link 114 allows the first and second lighting devices 102 and 104 to communicate directly without the need for the wireless network 108—for example, without the need to route any communications through the wireless network 108.

The user may then instruct the second lighting device 104 to establish communications with the first lighting device 102 to obtain configuration information for the wireless network 108 that will enable the second lighting device 104 to join the wireless network 108. In one embodiment, the user may instruct the second lighting device 104 to establish communications with the first lighting device 102 by the user directly interacting with the lighting device 104—for example, by directly manipulating user control features provided by the lighting device 104. In another embodiment, the user may use the user device 106 to instruct the second lighting device 104 to establish communications with the first lighting device 102. The user may use the app or other program provided by the user device 106 and a wireless connection to provide the instruction to the second lighting device 104. The wireless connection may be any type of wireless communication connection operating according to any known wireless communications standard or protocol such as, for example, Bluetooth, BLE, NFC, or any other short range wireless technology.

After receiving the instruction to establish communications with the first lighting device 102, the second lighting device 104 may join the wireless network provided by the first lighting device 102 when operating as a wireless access point. In one embodiment, the second lighting device 104 may establish communications with the first lighting device 102 over the wireless communication link 114 based on the predetermined SSID and password for the first lighting device 102 when operating as a Wi-Fi access point. The predetermined SSID and password for the secondary wireless network provided by the first lighting device 102 can be stored in a memory storage device of the second lighting device 104.

With communication established between the first and second lighting devices 102 and 104—for example, over the wireless communication link 114—the second lighting device 104 may generate and transmit a message to the first lighting device 102 that includes an encryption key of the second lighting device 104. The encryption key may be, for example, a Rivest-Shamir-Adleman (RSA) public key but is not so limited as any known encryption technology can be used to provide secure communications between the first and second lighting devices 102 and 104. The message may also contain identification information for the second lighting device 104 including, for example, a unique identifier or address for the second lighting device 104 and/or a serial number for the second lighting device 104.

The first lighting device 102 may receive and process the message transmitted by the second lighting device 104. The first lighting device 102 may generate and transmit a response message to the second lighting device 104 that includes the configuration information for the wireless network 108 that may enable the second lighting device 104 to connect to the wireless network 108 (often referred to as the credentials of the wireless network 108). The response message or any portion thereof (e.g., the credentials of the wireless network 108) may be encrypted. In one embodiment, the response message or any portion thereof (e.g., the credentials of the wireless network 108) may be encrypted based on the RSA public key provided by the second lighting device 104.

The second lighting device 104 may receive and process the response message from the first lighting device 102. After decrypting the response message or any portion thereof (e.g., the credentials for the wireless network 108), the second lighting device 104 may extract the credentials for the wireless network 108 from the response message. The second lighting device 104 may then join the wireless network 108 using the provided credentials. After joining the wireless network 108, the second lighting device 104 may communicate with the Proprietary cloud 110 to become enrolled as a device operating within the operating environment 100.

The first lighting device 102 may discontinue operation as a wireless access point and may rejoin the wireless network 108. The first lighting device 102 may communicate with the Proprietary cloud 110 to inform the Proprietary cloud 110 that the second lighting device 104 may attempt to enroll with the Proprietary cloud 110. The first lighting device 102 may provide identification information (e.g., a serial number) for the second lighting device 104 to the Proprietary cloud 110. The Proprietary cloud 110 may use the identification information for the second lighting device 104 to verify the second lighting device 104 and to establish communications with the second lighting device 104. The Proprietary cloud 110 may then communicate with the second lighting device 104 to enroll the second lighting device 104. The second lighting device 104 may then be added to the account maintained by the Proprietary cloud 110 for the operating environment 100.

Further configuration of the second lighting device 104 may be made by the user through interaction with the Proprietary cloud 110 using the user device 106. Information may then be exchanged between the second lighting device 104 and the Proprietary cloud 110 to configure operation of the second lighting device 104 in relation to the other components of the operating environment 100.

The user may install any number of additional lighting devices within the operating environment and may implement similar techniques to have the additional lighting devices connect with the wireless network 108 and enroll with the Proprietary cloud 110. Specifically, any additional lighting device may be instructed to interact with one of the first and second lighting devices 102 and 104 to obtain the credentials to join the wireless network 108. One of the first and second lighting devices 102 and 104 may be instructed to operate as an access point with predetermined credentials that may be known to any additional lighting device (e.g., pre-stored in a memory unit of any additionally installed lighting device). This allows any additional lighting device to be able to directly communicate with one of the first and second lighting devices 102 and 104 to obtain the credentials of the wireless network 108 and to then initiate enrollment with the Proprietary cloud 110. As a result, the user may not be required to interact with an additional lighting device to facilitate connection to the wireless network 108 and enrollment with the Proprietary cloud 110 as such steps may be automatically performed with the aid of one of the first and second lighting devices 102 and 104.

Figure 2:
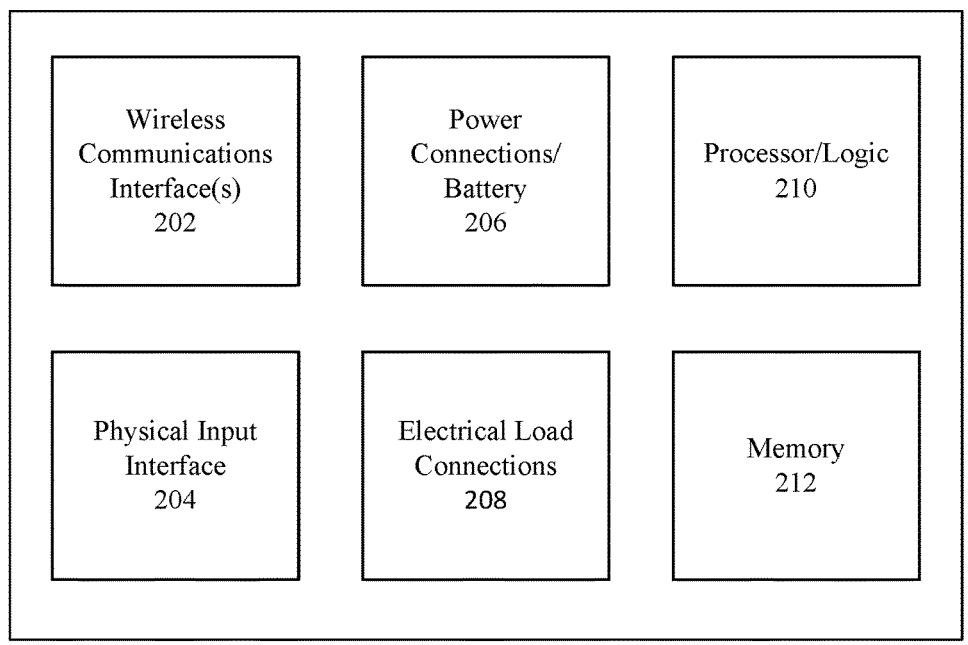
FIG. 2 illustrates a block diagram of an example embodiment of functional components of the lighting devices of FIG. 1.

FIG. 2 illustrates an example embodiment of the lighting device 102 (or, alternatively, the lighting device 104). Specifically, FIG. 2 provides a block diagram of example functional components of the lighting device 102. As shown, the lighting device 102 may include one or more wireless communications interfaces 202. The wireless communications interface 202 may enable the lighting device 102 to transmit and receive communications over a wireless network such as, for example, the wireless network 108 through any wireless communication technology. The wireless communications interface 202 may also enable the lighting device 102 to transmit and receive communications over the wireless communication links 112 or 114 through any wireless technology.

The lighting device 102 may include a physical input interface 204 for interfacing with one or more physical inputs that may be manipulated by the user. The physical input interface 204 may include or may be coupled to a variety of user input features including one or more push buttons, switches, or slide switches. The physical input interface 204 may provide a way for the user to instruct the lighting device 102 to enter the setup help mode of operation or to retrieve credentials for the wireless network 108 from another component within the operating environment 100. The physical input interface 204 may also provide a way for the user to locally control a lighting load of the lighting device 102.

The lighting device 102 may include a power source 206. The power source 206 may include electrical power connections and/or a battery. The power source 206 may provide power to any of the constituent functional components of the lighting device 102 depicted in FIG. 2. The power source 206 may be coupled to the power supply of the physical space in which the lighting device 102 operates and may provide battery backup during power failures or outages.

The lighting control device 102 may include an electrical load connection 208 providing electrical connectivity to a load of the lighting device 102. The load of the lighting device 102 may include any type of load such as, for example, incandescent, LED, CFL, EVL, Resistive, Halogen, Fluorescent, Inductive, etc.

The lighting device 102 may further include a processor circuit or logic circuity 210 and an associated memory component 212. The memory component 212 may store one or more programs for execution by the processor circuit 210 to implement one or more functions or features of the lighting device 102 as described herein. The processor circuit 210 may be implemented using any processor or logic device including, for example, any programmable logic device (PLD), application specific integrated circuit (ASIC), general purpose processor, or logic circuitry that is coupled to the memory component 212. The memory component 212 may be implemented using any machine-readable or computer-readable media capable of storing data, including both volatile and non-volatile memory, and may reside internal or external to the lighting device 102.

The processor circuit 210 may implement the functionalities of any of the components depicted in FIG. 2 or may control or adjust operation of any of the depicted components. Each component depicted in FIG. 2 may be coupled to the processor circuit 210 as well as any other depicted component. The depicted components may be implemented in hardware or software as appropriate, or any combination thereof.

The processor circuit 210 may generate messages for transmission over, for example, the wireless network 108 or over the wireless communication links 112 and 114 using the wireless communications interface 202. The processor circuit 210 may process messages received over the network 110 or over the wireless communication links 112 and 114 using the wireless communications interface 202. The processor circuit 210 may process messages received from any component of the operating environment 100. The memory component 212 may store the predetermined credentials for the wireless network that may be provided when another lighting device operates in the setup help mode (e.g., to provide the secondary or auxiliary wireless network). The memory component 212 may also store the encryption key for the lighting device 102. Further, the memory component 212 may store any other information or data related to operation of the lighting device 102 including, for example, any configuration data for establishing operation of the lighting device 102 and/or enrolling the lighting device 102 with the Proprietary cloud 110.

In one embodiment, the lighting device 102 may include further components and associated functionalities not shown in FIG. 2 including, for example, a voice control interface that may be used by the user to control the lighting device 102, one or more microphones to receive audible commands from the user, one or more speakers to output audio information to the user, and a display and display controller to render visual information. The display may include a touchscreen or a touch-sensitive display. Accordingly, the display may provide visual information to the user and/or may receive input from the user.

Figure 3:
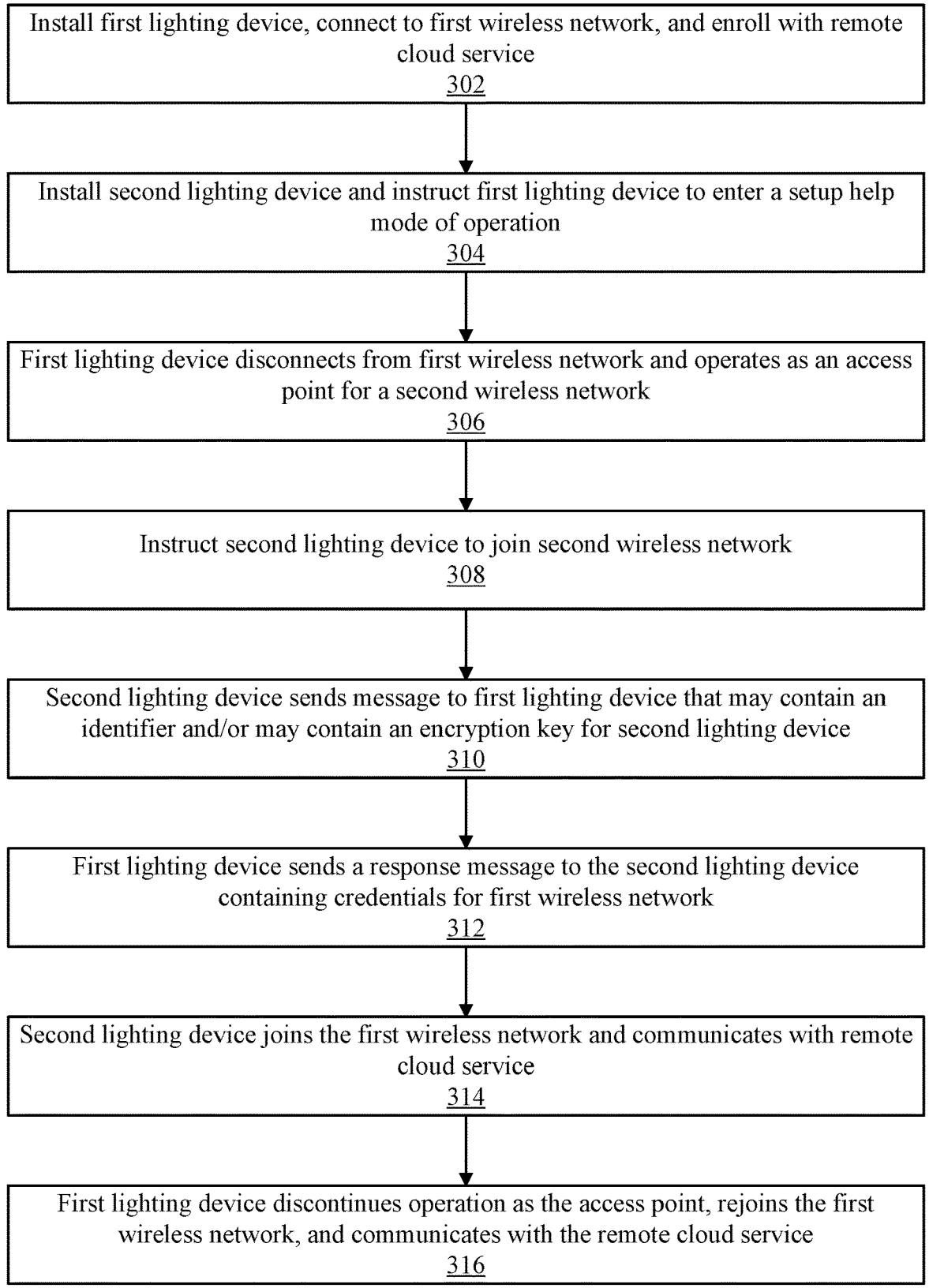
FIG. 3 illustrates a logic flow associated with the lighting devices of FIG. 1.

FIG. 3 illustrates an example of a logic flow 300 that may be representative of techniques for efficiently configuring lighting devices. For example, the logic flow 300 may be representative of operations that may be performed by one or more constituent components of the operating environment 100 depicted in FIG. 1. The logic flow 300 is not limited to the particular sequence presented unless otherwise indicated.

At block 302, the user installs the first lighting device 102, connects the first lighting device 102 to the wireless network 108, and may enroll the first lighting device 102 with the Proprietary cloud 110. The first lighting device 102 may store the credentials (e.g., network identifier and password) for the wireless network 108. The wireless network 108 may be considered to be a first or primary wireless network that is associated with and/or specific to the operating environment 100.

At block 304, the user installs the second lighting device 104 and instructs the first lighting device 102 to enter the setup help mode of operation.

At block 306, the first lighting device 102 disconnects from the wireless network 108 and begins operation as an access point to provide a predefined secondary wireless network. Operation of the first lighting device 102 as an access point may be based on predetermined configuration information stored by the first lighting device 102. Configuration and credential information for the secondary wireless network may be stored by any lighting device operating in the operating environment 100 including the second lighting device 104.

At block 308, the user instructs the second lighting device 104 to establish communications with the first lighting device 102 operating as an access point. In response, the second lighting device 104 uses predetermined configuration information stored by the second lighting device 104 to search for and join the secondary wireless network provided by the first lighting device 102.

At block 310, after joining the secondary wireless network provided by the first lighting device 102, the second lighting device 104 sends a first or initial message to the first lighting device 102 that may contain an identifier for the second lighting device 104 and/or may include an encryption key of the second lighting device 104.

At block 312, the first lighting device 102 sends a second or response message to the second lighting device 104 that contains the credentials for the wireless network 108. The response message may be encrypted using the received encryption key of the second lighting device 104.

At block 314, the second lighting device 104 begins a process to join the wireless network 108 based on the received credentials. Once connected to the wireless network 108, the second lighting device may enroll with the Proprietary cloud 110.

At block 316, the first lighting device 102 discontinues operation as an access point. The first lighting device 102 rejoins the wireless network 108. The first lighting device 102 may then provide the identification information for the second lighting device 104 to the Proprietary cloud and informs the Proprietary cloud 110 that the second lighting device 104 is attempting to enroll with the Proprietary cloud 110. The Proprietary cloud 110 stores the identification information for the second lighting device 104 and establishes communications with the second lighting device 104. The Proprietary cloud 110 and the second lighting device 104 may then interact to enroll the second lighting device 104.

In one embodiment, the secondary wireless network may be provided by a stand-alone electronic and/or computing device. For example, the stand-alone device may operate at all times as an access point for the secondary wireless network. The stand-alone device may be configured to store configuration information and/or credentials for the wireless network 108. The stand-alone device may interact with one or more lighting devices in the operating environment 100 to provide the stored configuration information and/or credentials for wireless network 108 to any other lighting device. The stand-alone device may be portable and may be moved throughout the operating environment 100 to interact with any newly installed lighting device (or any lighting device that may need to reconnect with the wireless network 108).

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

We claim:

1. A first lighting device in electrical communication with a lighting load, the first lighting device comprising:
   a memory component to store first credentials associated with a first network;
   logic, at least a portion of the logic implemented in circuitry coupled to the memory component, the logic configured to:
      receive, by the first lighting device, an instruction to enter a setup help mode, wherein the instruction is received directly from a user through a physical input interface or is received from a user device; and
      wherein after entering the setup help mode, the logic to automatically execute operations to:
         disconnect from the first wireless network;
         after disconnecting from the first wireless network, operate as an access point for a second wireless network;
         receive a message from a second lighting device, the message received from the second lighting device to include an encryption key of the second lighting device and an identifier of the second lighting device;
         transmit the identifier for the second lighting device to a remote cloud service;
         encrypt the first credentials for the first wireless network based on the encryption key of the second lighting device to create encrypted first credentials;
         generate a response message, the response message to include the encrypted first credentials for the first wireless network;
         transmit the response message to the second lighting device over the second wireless network;

discontinue operation as the access point for the second wireless network after transmitting the response message to the second lighting device; and join the first wireless network after discontinuing operation as the access point for the second wireless network.

2. The first lighting device of claim 1, the encryption key to comprise a Rivest-Shamir-Adleman (RSA) public key.

3. The first lighting device of claim 1, the logic to operate as an access point for the second wireless network based on predetermined configuration information for the second wireless network stored in the memory component.

4. The first lighting device of claim 3, the predetermined configuration information to include an identifier and a password for the second wireless network.

5. The first lighting device of claim 1, the first credentials for the first wireless network to include an identifier and a password for the first wireless network.

6. The first lighting device of claim 1, the logic to encrypt the response message prior to transmitting the response message to the second lighting device.

7. The first lighting device of claim 1, wherein the first wireless network is a Wi-Fi network or the second wireless network is a Wi-Fi network.

8. A method to automatically configure a second lighting device, the method comprising:
  receiving, by a first lighting device, an instruction to enter a setup help mode, the first lighting device configured to be coupled to a lighting load, the instruction received directly from a user through a physical input interface or from a user device;
  disconnecting from a first wireless network;
  after disconnecting from the first wireless network, operating as an access point for a second wireless network;
  receiving a message from a second lighting device, the message received from the second lighting device to include an encryption key of the second lighting device and an identifier of the second lighting device;
  transmitting the identifier for the second lighting device to a remote cloud service;
  encrypting the first credentials for the first wireless network based on the encryption key of the second lighting device to create encrypted first credentials;
  generating a response message, the response message to include the encrypted first credentials for the first wireless network;
  transmitting the response message to the second lighting device over the second wireless network;
  discontinuing operation as the access point for the second wireless network after transmitting the response message to the second lighting device; and
  joining the first wireless network after discontinuing operation as the access point for the second wireless network.

9. A first lighting device in electrical communication with a lighting load, the first lighting device comprising:
  a memory component to store credentials associated with a second wireless network;
  logic, at least a portion of the logic implemented in circuitry coupled to the memory component, the logic configured to:
    receive, by the first lighting device, an instruction to obtain first credentials for a first wireless network, the instruction received directly from a user through a physical input interface or from a user device;
    wherein after receiving an instruction to obtain the first credentials, the logic to automatically execute operations to:
      retrieve predetermined the second credentials for the second wireless network from the memory component;
      join the second wireless network based on the predetermined second credentials for the second wireless network;
      generate a message, the message to include an encryption key of the first lighting device and an identifier assigned to the first lighting device;
      transmit the identifier to the remote cloud service and a request to enroll with the remote cloud service;
      transmit the message to a second lighting device, the second lighting device operating as an access point for the second wireless network; and
      receive a response message from the second lighting device, the response message to include the first credentials for the first wireless network, wherein the first credentials for the first wireless network are encrypted based on the encryption key of the first lighting device; and
    automatically initiate enrollment with a remote cloud service; and
    join the first wireless network based on the first credentials for the first wireless network.

10. The first lighting device of claim 9, the encryption key to comprise a Rivest-Shamir-Adleman (RSA) public key.

11. The first lighting device of claim 9, the predetermined second credentials to include an identifier and a password for the second wireless network.

12. The first lighting device of claim 9, the first credentials for the first wireless network to include an identifier and a password for the first wireless network.

13. The first lighting device of claim 9, the logic to decrypt the response message prior to determining the first credentials for the first wireless network.

14. The first lighting device of claim 9, wherein the first wireless network is a Wi-Fi network or the second wireless network is a Wi-Fi network.

* * * * *